United States Patent [19]
Norfleet et al.

[11] Patent Number: 5,919,738
[45] Date of Patent: Jul. 6, 1999

[54] FLUIDS FOR USE IN DRILLING AND COMPLETION OPERATIONS COMPRISING WATER INSOLUBLE COLLOIDAL COMPLEXES FOR IMPROVED RHEOLOGY AND FILTRATION CONTROL

[75] Inventors: James E. Norfleet; Michael A. Jarrett; William M. Dye; Dennis K. Clapper, all of Houston; Geoffrey Robinson, Spring; Ronald G. Bland, Houston; John B. Weirich, Spring; Billy G. Chesser, Onalaska, all of Tex.

[73] Assignee: Baker Hughes Incorporated, Houston, Tex.

[21] Appl. No.: 08/823,851

[22] Filed: Mar. 25, 1997

Related U.S. Application Data

[60] Provisional application No. 60/036,394, Jan. 24, 1997.

[51] Int. Cl.$^6$ ........................................ C09K 7/02
[52] U.S. Cl. ............................ 507/136; 507/139; 507/140
[58] Field of Search .................................. 507/136, 140, 507/139

[56] References Cited

U.S. PATENT DOCUMENTS

| | | |
|---|---|---|
| 2,828,265 | 3/1958 | Van Strien . |
| 2,841,222 | 7/1958 | Smith . |
| 3,062,740 | 11/1962 | Reddie et al. . |
| 3,238,141 | 3/1966 | Gatza . |
| 3,639,233 | 2/1972 | Schultz et al. . |
| 3,811,504 | 5/1974 | Flournoy et al. . |
| 3,953,337 | 4/1976 | Walker et al. . |
| 4,016,932 | 4/1977 | Kalfoglou . |
| 4,059,154 | 11/1977 | Braden, Jr. et al. . |
| 4,066,124 | 1/1978 | Carlin et al. . |
| 4,077,471 | 3/1978 | Shupe et al. . |
| 4,490,263 | 12/1984 | Stapp et al. . |
| 4,758,357 | 7/1988 | Hoff . |
| 4,919,827 | 4/1990 | Harms . |
| 4,959,164 | 9/1990 | Engelmann et al. . |
| 5,008,026 | 4/1991 | Gardner et al. . |
| 5,057,234 | 10/1991 | Bland et al. . |
| 5,308,547 | 5/1994 | Burba, III et al. . |
| 5,358,044 | 10/1994 | Hale et al. . |
| 5,602,082 | 2/1997 | Hale et al. ........................... 507/115 |
| 5,643,858 | 7/1997 | Woolley . |
| 5,686,396 | 11/1997 | Hale et al. . |

FOREIGN PATENT DOCUMENTS

| | | |
|---|---|---|
| 0 430 602 B1 | 9/1995 | European Pat. Off. . |
| 2 238 560 | 6/1991 | United Kingdom . |
| 2297774 | 8/1996 | United Kingdom . |
| 2297775 | 8/1996 | United Kingdom . |

OTHER PUBLICATIONS

J. Muñoz, et al., "Structure and Rheology in Surfactant Systems." *Tenside Surf. Det.* 28 (*1991*) 3.

Todd M. Doscher, et al., "The Behavior of Nonionic Surface Active Agents in Salt Solutions." *Journal of Colloid Science* v. 6 No. 3 pp. 223–235 (Jun. 1951).

J. Muñoz Garcia, et al., "Rheological Behaviour of Aqueous Systems Containing Polyoxyethylene Fatty Alcohols with Different HLB." *Journal of Dispersion Science and Technology* v. 7 No. 4 pp. 453–477 (1986).

Todd M. Doscher "Characteristics of Detergent Suspended Drilling Fluids." *The Oil and Gas Journal* pp. 75–76, & 79–80 (Jun. 30, 1949).

Eric van Oort, et al. "Improving HPHT Stability of Water Based Drilling Fluids." Presented at 1997 SPE/IADC Drilling Conference held in Amsterdam, The Netherlands, Mar. 4–6, 1997.

*Primary Examiner*—C. H. Kelly
*Attorney, Agent, or Firm*—Madan & Morris, P.C.

[57] ABSTRACT

The present invention provides a method of preparing a fluid for use in drilling and completion operations comprising mixing a fluid comprising a salt of an alkaline earth metal with a nonionic colloid-forming material in an amount and under conditions sufficient to convert a majority of said nonionic colloid-forming material into water insoluble hydrated colloidal complexes comprising hydrated ions of said alkaline earth metal complexed with said nonionic colloid-forming material, said complexes being effective to improve a property of said fluid selected from the group consisting of rheology, fluid loss control, and a combination thereof.

55 Claims, No Drawings

FLUIDS FOR USE IN DRILLING AND COMPLETION OPERATIONS COMPRISING WATER INSOLUBLE COLLOIDAL COMPLEXES FOR IMPROVED RHEOLOGY AND FILTRATION CONTROL

This application claims the benefit of Ser. No. 06/036,394, filed on Jan. 24, 1997.

FIELD OF THE INVENTION

The present invention relates to fluids for use during drilling operations, particularly to brines, comprising water insoluble hydrated colloidal complexes effective to improve rheology and or fluid loss control properties of said fluid.

BACKGROUND OF THE INVENTION

Drilling operations typically involve mounting a drill bit on the lower end of a drill pipe or "drill stem" and rotating the drill bit against the bottom of a hole to penetrate a formation, creating a borehole. A drilling fluid—typically a drilling mud—may be circulated down through the drill pipe, out the drill bit, and back up to the surface through the annulus between the drill pipe and the borehole wall. The drilling fluid has a number of purposes, including cooling and lubricating the bit, carrying the cuttings from the hole to the surface, and exerting, a hydrostatic pressure against the borehole wall to prevent the flow of fluids from the surrounding formation into the borehole.

A drilling fluid with a relatively high viscosity at high shear rates can place undesirable mechanical constraints on the drilling equipment and may even damage the reservoir. Higher viscosity fluids also exert higher pressures outward on the borehole, which may cause mechanical damage to the formation and reduce the ability of the well to produce oil or gas. Higher viscosity fluids also may fracture the formation, requiring a drilling shut down in order to seal the fracture.

Damage to a reservoir is particularly harmful if it occurs while drilling through the "payzone," or the zone believed to hold recoverable oil or gas. In order to avoid such damage, a different fluid—known as a "drill-in" fluid—is pumped through the drill pipe while drilling through the payzone.

Another type of fluid used in oil and gas wells is a "completion fluid." A completion fluid is pumped down a well after drilling operations are completed and during the "completion phase." Drilling mud typically is removed from the well using "completion fluid," which typically is a clear brine. Then, the equipment required to produce fluids to the surface is installed in the well. A completion fluid must have sufficient viscosity to maintain the filter cake and sufficient elasticity to maintain a suspension of bridging or weighting agents. The viscosity of a completion brine typically is maintained using polymers, such as starches, derivatized starches, gums, derivatized gums, and cellulosics. Unfortunately, although these polymers are water-soluble, they have a relatively low hydration rate in brines because very little water actually is available to hydrate the polymers in highly saline brines. Hydrating the polymers can be time consuming and expensive. Less time consuming and expensive methods for hydrating polymers in highly saline brines are sorely needed. Also needed are methods which will entirely eliminate the need to add these water soluble polymers to drilling and completion fluids.

The viscosity of a brine also is affected by downhole temperatures. Preferably, any materials that are added to the fluid or brine should not adversely affect the rheology of the brine at low or high temperatures.

SUMMARY OF THE INVENTION

The present invention provides a method of preparing a fluid for use in drilling and completion operations comprising mixing a fluid comprising a salt of an alkaline earth metal with a nonionic colloid-forming material in an amount and under conditions sufficient to convert a majority of said nonionic colloid-forming material into water insoluble hydrated colloidal complexes comprising hydrated ions of said alkaline earth metal complexed with said nonionic colloid-forming material, said complexes being effective to improve a property of said fluid selected from the group consisting of rheology, fluid loss control, and a combination thereof

DETAILED DESCRIPTION OF THE INVENTION

In one aspect of the present invention, surfactants and/or glycol(s), preferably both, are used jointly in a brine to increase the rate of hydration of water-soluble polymers in the brine. In another aspect of the invention, the "surfactants" and/or glycol(s), hereinafter "nonionic colloid-forming materials," form water-insoluble colloidal complexes that are sufficient, alone, to provide desired rheology. These nonionic colloid-forming materials may eliminate the need to use water soluble polymers as viscosifiers, although water soluble polymers still may be needed to provide adequate filtration control.

Preferred drilling and completion fluids for the present invention are brines having a density of at least about 8.5 lb/gal, preferably calcium brines. The fluids can contain substantially any suitable salts, including, but not necessarily limited to salts based on metals, such as calcium, magnesium, sodium, potassium, cesium, zinc, aluminum, and lithium. Salts of alkaline earth metals, such as calcium, magnesium, and lithium, are preferred. The salt may contain substantially any anions, with preferred anions being less expensive anions including, but not necessarily limited to chlorides, bromides, formates, propionates, sulfates, acetates, and nitrates. The literature indicates that alkaline earth metal salts—particularly calcium salts—may be the only salts commercially available (at reasonable prices) that will produce satisfactory results in the present invention. Preferred salts are calcium chlorides and calcium bromides, a most preferred salt being a combination thereof.

As used herein, the term "water-soluble polymers" is defined to mean polymers that are capable of viscosifying a drilling fluid and/or providing filtration control for a drilling fluid, preferably a brine. Such polymers are known in the art. Preferred polymers are non-toxic polymers which include, but are not necessarily limited to water-soluble starches and derivatized versions thereof, water soluble gums and derivatized versions thereof, and water-soluble celluloses. Starches that are suitable for use in the present invention include, but are not necessarily limited to corn based and potato based starches, preferred starches being more temperature stable starches. Gums that are suitable for use in the present invention include, but are not necessarily limited to xanthan gums, wellan gums, scleroglucan gums, and guar gums. These polymers are widely available from commercial sources.

As used herein, the terms "derivatized starches" and "derivatized gums" refer to starches and gums that have been derivatized in a manner that renders them inherently non-fermentable in order to avoid the need for a preservative. Water-soluble "derivatized starches" and "derivatized gums" that should operate successfully as water-soluble polymers in brines include, but are not necessarily limited to: hydroxyalkyl starches and gums; starch and gum esters; cross-link starches and gums; hypochlorite oxidized starches and gums; starch and gum phosphate monoesters; cationic starches and gums; starch and gum xanthates; and, dialdehyde starches and gums. These derivatized starches and gums can be manufactured using known means, such as those set forth in detail in Chapter X of *Starch: Chemistry and Technology* 311–388 (Roy L. Whistler, et al. eds., 1984), incorporated herein by reference.

Specific examples of suitable derivatized starches and gums that fall within the foregoing categories include, but are not necessarily limited to: carboxymethyl starches and gums; hydroxyethyl starches and gums, hydroxypropyl starches and gums; hydroxybutyl starches and gums; carboxymethylhydroxyethyl starches and gums; carboxymethylhydroxypropyl starches and gums; carboxymethylhydroxybutyl starches and gums; polyacrylamide starches and gums; and, other starch and gum copolymers.

A preferred polymer is a derivatized starch known as DFE-124 (herein EXP-2350D2), an experimental polymer produced by Chemstar, Minneapolis, Minn.

Nonionic colloid-forming materials suitable for use in the present invention preferably are water-soluble but insoluble in a substrate salt solution. The materials preferably are glycols or have a high molar concentration of ethylene oxide, and—in the case of ethoxylated surfactants—have a hydrophilic/lipophilic balance (HLB) of between about 8–19, preferably between about 12–19. Although the nonionic colloid-forming materials that will work in the invention are defined in terms normally used to define surfactants, these materials do not act as surfactants in the dispersions of the present invention. Rather, the alkaline earth metal ions in the fluid are believed to complex with the polar sites on the nonionic colloid-forming material, resulting in water insoluble complexes which give the fluid elasticity, and which advantageously affect the rheology and fluid loss control properties of the fluid. The removal of alkaline earth metal ions from the solution into these nonionic colloidal complexes also is believed to free up water to hydrate any water soluble polymers in the fluid.

Suitable nonionic colloid-forming materials for use in the present invention include, but are not necessarily limited to: ethoxylated alcohols, such as oleyl alcohol ethoxylate and ethoxylated isotridecyl alcohols; ethoxylated diols; ethoxylated oils, such as ethoxylated castor oil; ethoxylated acids; ethylene oxide/propylene oxide block copolymers; ethoxylated pyrrolidones; ethoxylated carbohydrates; ethoxylated amides; ethoxylated amines; ethoxylated phenols; ethoxylated thiols; and, ethoxylated esters, such as polyethylene glycol esters and ethoxylated sorbitol esters. Preferred materials are non-toxic. A most preferred material is ethoxylated cast oil. The foregoing surfactants are widely available from a variety of commercial sources.

Suitable non-ionic colloid-forming materials produce a birefringent dispersion upon contact with a suitable brine. Where the nonionic colloid-forming material is a polyalkylene glycol, ethylene oxide must be a component of the polyalkylene glycol. Linear polyalkiene glycols produce stronger birefringence upon combination with a suitable brine. Thus, alcohols and diols preferably should be used as a starting material in forming the polyalkylene glycol. Even if the polyalkylene glycol has a linear structure, the ether oxygens must be closely spaced—preferably separated by no more than two carbon atoms. Poly-1,3-propylene glycols may work in the invention. The use of a triol to form the polyalkylene glycol may interfere with the formation of a birefringent structure, however, a birefringent structure still may form if the molecular weight of the ethylene oxide in the polalkylene oxide is increased. The remainder of the polyalkylene oxide structure may include, but is not necessarily limited to materials selected from the group consisting of: polyethylene glycol homopolymers and their derivatives; polypropylene glycol homopolymers and their derivatives, polybutylene glycol homopolymers and their derivatives; and, copolymers and terpolymers having various ratios thereof. Preferred glycols have a molecular weight range of above about 50 and comprise at least about 50% ethylene oxide, preferably about 75% ethylene oxide, most preferably about 100% ethylene oxide. The foregoing glycols are commercially available from a variety of commercial sources, such as Union Carbide Corporation.

The nonionic colloid-forming material may be added to the brine or fluid using any suitable means. High shear is not necessary. Even simply shaking the mixture by hand is sufficient to form the dispersions of the present invention. Dispersions of the more viscous or solid glycols may be facilitated by first dissolving the glycol in freshwater, and then adding the freshwater solution to the brine.

Bridging or weighting agents preferably should be added to bridge the pores in the formation. Suitable bridging or weighting agents include, but are not necessarily limited to ground marble or calcium carbonate particles, such as MIL-CARB, available from Baker Hughes INTEQ. Preferred calcium carbonate particles have a mean particle size of about 30 microns. Calcium carbonate has the advantage that it is acid soluble, and therefore can be removed from the formation by acid flushing. If calcium carbonate is used as the bridging agent, about 50 pounds should be used per barrel of brine.

The invention will be better understood with reference to the following examples, which are illustrative only, and should not be construed as limiting the invention:

EXAMPLE I

One laboratory barrel (350 ml) of a 13 lb/gal brine was prepared by mixing 3 vol % 10.5 ml) of ethoxylated castor oil into a 13 lb/gal $CaCl_2/CaBr_2$ brine and simply hand shaking the mixture. Simple hand shaking was used to simulate poor mixing conditions—i.e., worst case conditions. The result was a milky or clouded dispersion. In order to determine whether the dispersion had elastic properties sufficient to suspend solids, 50 lb/bbl of calcium carbonate (SG 2.65) were added, the mixture was hand shaken and then allowed to sit for 16 hours. The dispersion was tested for static settling of the calcium carbonate. No settling occurred, indicating that the dispersion had desired solids suspension or elastic properties for a drilling fluid without the need to add biopolymer(s). Rheometer readings indicated that the fluid had an elastic structure dominating the viscous structure, confirming that the dispersion was capable of suspending solids.

EXAMPLE II

A dispersion containing xanthan gum and tap water was prepared and the elasticity of the xanthan gum dispersion was compared to the elasticity of the cloudy dispersions prepared in Example I. The elastic moduli of the two fluids were similar, confirming that the dispersion was elastic in nature, and that the elasticity should be similar to that provided by commonly used biopolymers.

EXAMPLE III

Two fluids were prepared as in Example I. In one fluid, the base fluid was 13.1 lb/gal $CaCl_2/CaBr_2$. In the other fluid, the base fluid was 13 lb/gal $CaBr_2$. The elastic modulus was measured initially and after heat aging for 16 hours at 150, 200, 250° F., in order to test the thermal stability of the dispersion. In the $CaCl_2/CaBr_2$ brine, the modulus did not improve or degrade upon heating. In the $CaBr_2$ brine, temperature aging up to 200° F. did not affect the elastic modulus, but the modulus improved at 250° F.

EXAMPLE IV

UV tests were run to determine how much of the ethoxylated castor oil in the dispersions was incorporated into the dispersion "particles", or out of solution, and how much remained in solution. The results indicated that 99.9% of the ethoxylate castor oil was out of solution.

EXAMPLE V

One laboratory barrel (350 ml) of brines containing the salts listed in Table I were prepared by mixing 3 vol % 10.5 ml) of ethoxylated castor oil into a $CaCl_2/CaBr_2$ oilfield brine and hand shaking the mixture. Whether the ethoxylated castor oil was soluble (clear) or insoluble (milky) is noted in the following Table:

| Brine | Density, $lb_m$*/gal | Soluble in Brine | Appearance |
|---|---|---|---|
| $CaBr_2$ | 13.5 | No | Milky Dispersion |
| KBr | 11.0 | Yes | Clear |
| NaBr | 12.5 | Yes | Clear |
| $ZnBr_2$ | 19.2 | Yes | Clear |
| $CaCl_2$ | 13.5 | No | Milky Dispersion |
| $CaCl_2$ | 11.5 | No | Milky Dispersion |
| NaCl | 10.0 | Yes | Clear |
| KCl | 9.5 | Yes | Clear |
| $KCO_2H$ | 13.1 | No | Waxy Precipitate |
| $MgCl_2$ | 10.6 | Yes | Clear |
| $NaCO_2H$ | 10.5 | No | Waxy Precipitate |

Ethoxylated castor oil formed an elastic structure suitable for suspending solids in a drilling fluid only in calcium based brines.

EXAMPLE VI

To determine the effect of ethoxylated castor oil on the viscosity of the various brines, the viscosity of the each of the brines tested in Example V was measured before and after adding 3 vol % ethoxylated castor oil ("ECO"). In order to test the viscosity of brines that were cloudy after the addition of ethoxylated castor oil, the dispersion was allowed to sit until two phases formed, one cloudy and one supernate. The supernatant was extracted and the viscosity of the supernatant was measured. The results are shown in Table II:

| Brine | Density, lbm/gal | Brine Viscosity, Pa*S | Viscosity with ECO, Pa*S |
|---|---|---|---|
| KBr | 11.0 | 1.83 | 1.95 |
| NaBr | 12.5 | 2.61 | 3.29 |
| $ZnBr_2$ | 19.2 | 17.13 | 17.14 |
| NaCl | 10.0 | 2.72 | 2.82 |
| KCl | 9.5 | 1.75 | 2.11 |
| $KCO_2H$ | 13.1 | 9.21 | 7.83 |
| $NaCO_2H$ | 10.5 | 7.26 | 6.76 |
| $CaBr_2$ | 13.5 | 4.98 | 4.87 |
| $CaCl_2/CaBr_2$ | 13.5 | 19.51 | 18.44 |
| $CaCl_2$ | 11.5 | 12.61 | 10.4 |

Because ethoxylated castor oil is very viscous, the viscosity increased where the ethoxylated castor oil was soluble, or produced a clear solution. In the calcium brines, in which the ethoxylated castor oil was insoluble or produced a cloudy dispersion, the viscosity of the supernatant was less than the viscosity of the brine, indicating that calcium is being drawn out of the brine to form the elastic complexes.

EXAMPLE VII

Experiments were done to determine the chemical nature of the clouding. A dispersion of 3% ethoxylated castor oil was made by mixing into a 13.1 lb/gal $CaCl_2/CaBr_2$ brine and hand shaking the mixture, forming a cloudy dispersion. The dispersion then was filtered at 100 psi through API hard filter paper using an API low pressure filter press. The resulting cake on the filter paper is the material responsible for the clouding and the elasticity of the dispersions. IR analysis indicated that the filter cake was a coordinated complex of calcium cations with the ethereal oxygen in the ethoxylated castor oil.

EXAMPLE VIII

The $CaCl_2/CaBr_2$ formulation also was submitted to surface tension testing. The testing determined that the ethoxylated castor oil did not reduce surface tension in the $CaCl_2/CaBr_2$ brines, confirming that the cloudiness was comprised of water insoluble complexes.

EXAMPLE IX

A solution of 25 wt % calcium chloride, 25 wt % calcium bromide, and 50 wt % water was prepared by mixing 165.8 g of calcium chloride dihydrate (equivalent to 125 g anhydrous calcium chloride), 131.6 g calcium bromide dihydrate (equivalent to 125 g anhydrous calcium bromide), for a total of 297.4 g of calcium dihydrate salts. 202.6 g of water were added and the mixture was heated and stirred until the salts dissolved, forming a solution containing 50 wt % dissolved solids. The solution had a density of 13.26 lb/gal and a specific gravity of 1.5905.

1 wt % and 5 wt % of two polyalkylene glycols—UCON 75H450 (a 75/25 EO/PO) and UCON 50HB260 (50/50 EO/PO), obtained from Union Carbide Corporation—were added to the salt solution after cooling the solution to room temperature. The solubility of the glycol in the salt solution, the birefringence of the resulting dispersion, and comments on the structure of the solution or dispersion are shown in the following Table. In all of the following Tables, percentages are expressed as wt %:

| Glycol | Concentration | Soluble | Birefringence | Structure |
|---|---|---|---|---|
| UCON 75H450 | 1% | No | Strong | Large (20–50$\mu$) |
| UCON 75H450 | 5% | No | Strong | Small (6–13$\mu$) |
| UCON 50HB260 | 1% | No | Weak | Small |
| UCON 50HB260 | 5% | No | Weak | Weak, very fine |

The 50HB260 dispersions were heated to 150° F. Birefringence was lost between about 130–135° F., was not regained upon cooling to about 104° F., but was regained upon cooling to room temperature.

The foregoing results indicate that the glycols formed a dispersion of anisotropic liquid crystals.

EXAMPLE X

The procedures of Example IX were repeated using a 53.794 wt % solution of calcium bromide brine having a density of 13.816 lb/gal and the following glycols: UCON 50HB100, an alcohol started polymer comprising equal amounts of ethylene oxide and propylene oxide, UCON 50HB660, also an alcohol started polymer comprising equal amounts of ethylene oxide and propylene oxide, UCON 75H1400, a diol started polymer comprising 75 wt % oxyethylene and 25 wt % oxypropylene; DOW 15-200, a triol started polymer comprising 50 wt % oxyethylene and 50 wt % oxypropylene. The UCON products all are available from Union Carbide. The DOW products are available from Dow Chemical Co.

The results are given in the following Table, in which percentages are wt %:

| Glycol | Concentration | Soluble | Birefringence | Structure |
|---|---|---|---|---|
| UCON 50HB100 | 5% | Yes | No | ? |
| UCON 50HB660 | 1% | No | Yes | Fine birefringent crystals |
| UCON 75H1400 | 1% | No | Yes | Chunky birefringent crystals which seem to lose birefringency on boundary |
| DOW 15-200 | 2 | No | No | |
| DOW 15-200 | 1 | ? | No | |

From the foregoing, the triol-started glycols either interfered with the formation of a birefringent structure, or the resulting polyalkylene glycol did not contain a sufficient amount of ethylene glycol to form a birefringent structure.

EXAMPLE XI

Drops of the following glycols were placed side-by-side with drops of 13.816 lb/gal calcium bromide. The results are shown in the following Table:

| Glycol | Birefringence | Structure |
|---|---|---|
| UCON 50HB660 | Yes | Slow to develop at the interface, but strong |
| UCON 75H1400 | Yes | Quicker, but not as strong as 50HB660. |
| DOW 15-200 | No | — |

Strong birefringence occurred with the UCON glycols, indicating that anisotropic crystals were formed.

EXAMPLE XII

1% and 5% dispersions of E-400 (a polyethylene glycol homopolymer with a molecular weight of 400 available from Dow Chemical Co.) in 13.816 lb/gal calcium bromide brine were prepared. The E-400 was insoluble in the brine and the dispersions exhibited strong birefringence. A drop of the 5% dispersion was placed on a slide with a cover slip and heated on a hot stage. The dispersion began to lose birefringence at about 160–170° F., and lost biorefringency completely at about 190–200° F. Birefringency began to return when the dispersion was cooled to about 170° F.

EXAMPLE XIII

Drops of 13.816 lb/gal calcium bromide brine and drops of the following materials were placed on a slide side-by-side and covered with a coverslip:

From Dow Chemical Co.:
D6542 (a polypropylene glycol homopolymer)
D6545 (an ethoxylated glycerol)
DM-30 (a diol started copolymer)
MPEG-350 (a methanol started polyethylene glycol homopolymer)
From Baker Hughes INTEQ:
AQUACOL D (an ethoxylated alcohol)
The results are shown in the following Table:

| Additive | Birefringence | Structure |
|---|---|---|
| D6542 | No | |
| AQUACOL D | No | |
| DM-30 | Yes | Developed somewhat slowly, but strengthened with time |
| MPEG 350 | Yes | Instant and strong birefringence with large crystals |
| D6545 | No | May be soluble. |

The birefringence exhibited appears to be due to a calcium halide/water/glycol crystal/liquid crystal. The polyethylene oxide chain apparently is responsible for the crystalline structure, but branching of the ethylene oxide chain, as in ethoxylated glycerols, appears to prevent crystal formation. Polypropylene glycols apparently don't work, although EO/PO's will work if the content of EO and the molecular weight is high enough.

EXAMPLE XIV

One drop each of PolyTHF-650 and PolyTHF-1000, which are polytetrahydrofurans having the respective molecular weights obtained from BASF Corporation, and one drop of PEG 600 obtained from Dow Chemical Co. was placed on a slide. One drop of 14.2 lb/gal calcium bromide solution was placed beside each drop. When a cover slip was placed over the drops so that the brine contacted the glycol, neither of the PolyTHF drops formed crystals. The PEG 600 drops formed strongly birefringent crystals. In a mix of 5 wt % in deionized water, PolyTHF-650 did not appear to be soluble in the brine.

Many modifications and variations may be made to the embodiments described herein without departing from the spirit of the present invention. The embodiments described herein are illustrative only should not be construed as limiting the scope of the present invention.

We claim:

1. A method of preparing a brine for use in drilling and completion operations comprising mixing a brine comprising a salt of an alkaline earth metal with a water soluble nonionic colloid-forming material in an amount and under conditions sufficient to convert a majority of said water soluble nonionic colloid-forming material into water insoluble hydrated colloidal complexes comprising hydrated ions of said alkaline earth metal complexed with said water soluble nonionic colloid-forming material, said complexes being effective to impart to said brine sufficient elasticity for solids suspension.

2. The method of claim 1 wherein said water soluble nonionic colloidal material comprises an ethoxylated surfactant having a hydrophilic/lipophilic balance of at least about 8.

3. The method of claim 1 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

4. The method of claim 1 wherein said water soluble nonionic colloid-forming material comprises about 5 wt % or less of said brine.

5. The method of claim 1 wherein said water soluble nonionic colloid forming material is comprises a polyalkylene glycol.

6. A method of preparing a brine for use in drilling and completion operations comprising mixing a brine comprising a salt of an alkaline earth metal at a density of at least about 8.5 lb/gal with a water soluble nonionic colloid-forming material in an amount and under conditions sufficient to form water insoluble hydrated colloidal complexes comprising hydrated ions of said alkaline earth metal complexed with said water soluble nonionic colloid-forming material, said complexes being effective to impart to said brine sufficient elasticity for solids suspension.

7. The method of claim 6 wherein said water soluble nonionic colloidal material comprises an ethoxylated surfactant having a hydrophilic/lipophilic balance of at least about 8.

8. The method of claim 6 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

9. The method of claim 6 wherein said water soluble nonionic colloid-forming material comprises about 5 wt % or less of said brine.

10. The method of claim 6 wherein said water soluble nonionic colloid forming material is comprises a polyalkylene glycol.

11. The method of claim 6 wherein said alkaline earth metal comprises calcium.

12. The method of claim 11 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

13. The method of claim 12 wherein said nonionic colloid-forming material comprises about 5 wt % or less of said brine.

14. A method of preparing a brine for use in drilling and completion operations comprising mixing a brine comprising a calcium salt with a water soluble nonionic colloid-forming material in an amount and under conditions sufficient to convert a majority of said water soluble nonionic colloid-forming material into water insoluble hydrated colloidal complexes comprising hydrated ions of calcium complexed with said water soluble nonionic colloid-forming material, said complexes being effective to impart to said brine sufficient elasticity for solids suspension.

15. The method of claim 14 wherein said water soluble nonionic colloid-forming material comprises about 5 wt % or less of said brine.

16. The method of claim 14 wherein said water soluble nonionic colloid forming material is comprises a polyalkylene glycol.

17. A method of preparing a brine for use in drilling and completion operations comprising mixing a brine comprising a salt of an alkaline earth metal at a density of at least about 8.5 lb/gal with a water soluble nonionic colloid-forming material in an amount and under conditions sufficient form water insoluble hydrated colloidal complexes comprising hydrated ions of calcium complexed with said water soluble nonionic colloid-forming material, said complexes being effective to impart to said brine sufficient elasticity for solids suspension.

18. The method of claim 17 wherein said water soluble nonionic colloid-forming material comprises about 5 wt % or less of said brine.

19. A method of preparing a brine for use in drilling and completion operations comprising mixing a brine comprising a calcium salt at a density of at least about 8.5 lb/gal with a water soluble nonionic colloid-forming material in an amount and under conditions sufficient to convert a majority of said water soluble nonionic colloid-forming material to water insoluble hydrated colloidal complexes comprising hydrated ions of calcium complexed with said water soluble nonionic colloid-forming material, said complexes being effective to impart to said brine sufficient elasticity for solids suspension.

20. The method of claim 19 wherein said water soluble nonionic colloidal material comprises an ethoxylated surfactant having a hydrophilic/lipophilic balance of at least about 8.

21. A method of preparing a brine for use in drilling and completion operations comprising mixing a brine comprising a calcium salt at a density of at least about 8.5 lb/gal with a water soluble nonionic colloid-forming material comprising an ethoxylated surfactant having a hydrophilic/lipophilic balance of at least about 8 in an amount and under conditions sufficient to convert a majority of said water soluble nonionic colloid-forming material to water insoluble hydrated colloidal complexes comprising hydrated ions of calcium complexed with said water soluble nonionic colloid-forming material, said complexes being effective to impart to said brine sufficient elasticity for solids suspension.

22. The method of claim 21 wherein said nonionic colloid-forming material comprises about 5 wt % or less of said brine.

23. A method of preparing a brine for use in drilling and completion operations comprising mixing a brine comprising a calcium salt at a density of at least about 8.5 lb/gal with ethoxylated castor oil in an amount and under conditions sufficient to convert a majority of said ethoxylated castor oil to water insoluble hydrated colloidal complexes comprising hydrated ions of said calcium complexed with said ethoxylated castor oil, said complexes being effective to impart to said brine sufficient elasticity for solids suspension.

24. The method of claim 23 wherein said water soluble nonionic colloidal material comprises an ethoxylated surfactant having a hydrophilic/lipophilic balance of at least about 8.

25. The method of claim 23 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

26. The method of claims 23 wherein said mixing takes place at conditions sufficient form water insoluble hydrated colloidal complexes comprising hydrated ions of said alkaline earth metal complexed with said water soluble nonionic colloid-forming material, said complexes being effective to improve a property of said brine selected from the group consisting of rheology, fluid loss control, and a combination thereof.

27. The method of claim 23 wherein said water soluble nonionic colloid forming material is comprises a polyalkylene glycol.

28. A method of preparing a brine for use in drilling and completion operations comprising mixing a brine comprising a salt of an alkaline earth metal with less than about 5 wt % of a water soluble nonionic colloid-forming material.

29. The method of claim 28 wherein said alkaline earth metal comprises calcium.

30. The method of claim 28 wherein said water soluble nonionic colloidal material comprises an ethoxylated surfactant having a hydrophilic/lipophilic balance of at least about 8.

31. The method of claim 29 wherein said water soluble nonionic colloidal material comprises an ethoxylated surfactant having a hydrophilic/lipophilic balance of at least about 8.

32. The method of claim 28 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

33. The method of claim 29 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

34. The method of claim 28 wherein said mixing takes place at conditions sufficient form water insoluble hydrated colloidal complexes comprising hydrated ions of said alkaline earth metal complexed with said water soluble nonionic colloid-forming material, said complexes being effective to improve a property of said brine selected from the group consisting of rheology, fluid loss control, and a combination thereof.

35. The method of claim 28 wherein said water soluble nonionic colloid forming material is comprises a polyalkylene glycol.

36. A method of preparing a brine for use in drilling and completion operations comprising mixing a brine comprising a salt of an alkaline earth metal at a density of at least about 8.5 lb/gal with less than about 5 wt % of a water soluble nonionic colloid-forming material.

37. The method of claim 36 wherein said alkaline earth metal comprises calcium.

38. The method of claim 36 wherein said water soluble nonionic colloidal material comprises an ethoxylated surfactant having a hydrophilic/lipophilic balance of at least about 8.

39. The method of claim 37 wherein said water soluble nonionic colloidal material comprises an ethoxylated surfactant having a hydrophilic/lipophilic balance of at least about 8.

40. The method of claim 36 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

41. The method of claim 37 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

42. A brine for use in drilling and completion operations comprising water insoluble hydrated colloidal complexes comprising alkaline earth metal ions complexed with water soluble nonionic colloid-forming material in an amount sufficient to impart to said brine sufficient elasticity for solids suspension.

43. The brine of claim 42 comprising a brine having a density of at least about 8.5 lb/gal.

44. The brine of claim 42 wherein said alkaline earth metal ions comprise calcium ions and said water soluble nonionic colloidal material comprises an ethoxylated surfactant having a hydrophilic/lipophilic balance of at least about 8.

45. The brine of claim 43 wherein said alkaline earth metal ions comprise calcium ions and said water soluble nonionic colloidal material comprises an ethoxylated surfactant having a hydrophilic/lipophilic balance of at least about 8.

46. The method of claim 42 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

47. The method of claim 43 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

48. The brine of claim 42 wherein said water soluble nonionic colloid forming material is comprises a polyalkylene glycol.

49. A brine for use in drilling and completion operations comprising water insoluble hydrated colloidal complexes comprising alkaline earth metal ions complexed with a water soluble nonionic colloid-forming material, said water soluble nonionic colloid-forming material comprising less than about 5 wt % of said brine.

50. The brine of claim 49 comprising a brine having a density of at least about 8.5 lb/gal.

51. The brine of claim 49 wherein said alkaline earth metal ions comprise calcium ions and said water soluble nonionic colloidal material comprises an ethoxylated surfactant having a hydrophilic/lipophilic balance of at least about 8.

52. The brine of claim 50 wherein said alkaline earth metal ions comprise calcium ions and said water soluble nonionic colloidal material comprises an ethoxylated surfactant having a hydrophilic/lipophilic balance of at least about 8.

53. The method of claim 49 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

54. The method of claim 50 wherein said water soluble nonionic colloid-forming material is selected from the group consisting of ethoxylated alcohols, ethoxylated diols, ethoxylated oils, ethoxylated acids, ethoxylated pyrrolidones, ethoxylated carbohydrates, ethoxylated amides, ethoxylated amines, ethoxylated phenols, ethoxylated thiols, polyalkylene oxides comprising alkylene groups having between about 1–6 carbon atoms, copolymers of alkylene groups having between about 1–6 carbon atoms, ethoxylated esters, polyethylene glycols, and polyethylene glycol ethers.

55. The brine of claim 49 wherein said water soluble nonionic colloid forming material is comprises a polyalkylene glycol.

\* \* \* \* \*